Patented June 12, 1945

2,378,009

UNITED STATES PATENT OFFICE 2,378,009

PRODUCTION OF ESTERS

William E. Hanford and John R. Roland, Wilmington, Del., assignors to E. I. du Pont de Nemours & Company, Wilmington, Del., a corporation of Delaware No Drawing. Application September 19, 1941, Serial No. 411,551

14 Claims. (Cl. 260—488)

This invention relates to esters containing a carbethoxy group linked to a tertiary carbon atom and more specifically to ethyl alpha-methyl-alpha-ethylbutyrate and to a process for its preparation.

A number of esters containing carbethoxy groups linked to tertiary carbon atoms are known and their preparation has been successfully carried out by esterification of the corresponding acids. The esterification rates of such acids however are impractically slow and methods involving intermediate steps are tedious and expensive.

It is an object of this invention to overcome the problems of the prior art and to provide an improved process for the production of esters containing a carbethoxy group linked to a tertiary carbon atom.

It is a further and more specific object of this invention to provide a process for producing ethyl alpha-methyl-alpha-ethylbutyrate.

Other objects and advantages of this invention will be apparent in the following specification in which the details and preferred embodiments of the invention are described.

According to the present invention ethyl alpha-methyl-alpha-ethylbutyrate is prepared by heating a mixture of carbon monoxide and ethylene in a strongly acid medium. As it is generally practiced, the present invention comprises heating at a temperature within the range of 50 to 200° C. a mixture of carbon monoxide, ethylene and a strong acid catalyst, the reactants being maintained in intimate mutual contact such as by agitation, turbulent flow, efficient bubbling of the gases through the liquid phase or the like. The heating is preferably carried out at a temperature within the range of from 75 to 150° C., although higher or lower temperatures may be used. However, lower temperatures tend to favor a slow reaction rate and higher temperatures make for difficult control of the reaction as well as the introduction of numerous side reactions.

In order to maintain a sufficient concentration of carbon monoxide and ethylene the reaction is suitably carried out under pressure. This may be as low as one atmosphere total gas pressure, but is preferably in the range of from 200 to 1000 atmospheres. The upper limit of pressure which may be used is determined solely by the strength of the equipment available.

The overall equation for the reaction is

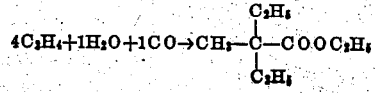

Consideration of this equation shows that the ethylene should be in molar excess. Preferably, the mole ratio of ethylene to carbon monoxide should lie between 1:1 and 6:1, although wider variations are permissible.

The strong acid used as catalyst may be any of the acid-reacting hydrates of inorganic compounds. Suitable examples of such substances are $BF_3.(H_2O)_x$, $SO_3.(H_2O)_x$, $P_2O_5.(3H_2O)_x$, $ZnCl_2.(H_2O)_x$, $TiCl_4.(H_2O)_x$ and the like. The subscript $x$ in the foregoing formulas may vary from 0.5 to about 5. Boron fluoride hydrate with a mole ratio of $BF_3$ to water from 1:1 to 1:3 is a preferred catalyst.

The yield of ethyl alpha-methyl-alpha-ethylbutyrate is considerably improved by the inclusion of a peroxide compound in the reaction charge. By peroxide compounds it is meant to include compounds which are either formed by the action of hydrogen peroxide on ordinary acids or else give rise to hydrogen peroxide on treatment with dilute sulfuric acid. Benzoyl peroxide, acetyl peroxide, acetyl benzoyl peroxide, alkali metal and ammonium persulfated typify types of peroxides which are advantageous in the operation of this process.

The following general procedure illustrates one manner of practicing this invention which may be operated as a batch, semi-batch or continuous process. A reaction vessel is charged with boron fluoride hydrate and if desired a small amount of peroxide catalyst. The vessel is closed and placed in an agitating machine fitted with a heating coil. Internal recording and external controlling thermocouples are placed in position and the vessel is connected to a source of ethylene. Ethylene is admitted to the vessel to such a pressure that, with the additional pressure of carbon monoxide, the pressure at reaction temperature will be safely within the limits of the vessel. The vessel is then closed off from the ethylene supply, disconnected and connected to a source of carbon monoxide. The carbon monoxide is admitted to the desired extent and heating and agitation are started. Alternatively the carbon monoxide may be introduced first or the two gases may be premixed in the desired proportions and then charged into the reactor.

Upon reaching the reaction temperature the reaction starts and may be followed by a pressure decrease. The pressure may be maintained in the desired range during the reaction by the periodic addition of gas, preferably ethylene. When the reaction is complete as evidenced by cessation of pressure drop the vessel is allowed to cool, bled of excess gas, opened and discharged. The ethyl alpha-methyl-alpha-ethylbutyrate is isolated from the reaction mixture by fractional distillation or by steam distillation followed by fractional distillation of the organic phase of the steam distillate.

Pure ethyl alpha-methyl-alpha-ethylbutyrate boils at 166-166.7° C. at atmospheric pressure and has $n_D^{25}=1.4100$, $d_4^{25}$ 0.8687. The ester has a decidedly pleasant camphoraceous odor. This ester, which is decidedly resistant to alkali treatment, may be identified by hydrolysis with 48% hydrobromic acid. The ethyl bromide evolved from this hydrolysis is collected and identified by its boiling point of 37-40° C., its refractive index at 26.5° C. of 1.4137 and by its insolubility in cold concentrated sulfuric acid. This other product of the hydrobromic acid hydrolysis is alpha-methyl-alpha-ethylbutyric acid which may be converted by way of the chloride to the amide and anilide, compounds reported in the literature (Hardy, J. Chem. Soc. 1938, 464). The melting points of these derivatives of the product of the present invention are compared with Hardy's derivatives in the table below:

| α-M α-E butyrate | Present products | Hardy's sample | Mixed melting point | Hardy's "Authentic specimen" |
| --- | --- | --- | --- | --- |
| | Degrees | Degrees | Degrees | Degrees |
| Amide | 73-74 | 74-75 | 74-75.5 | 75.5-76 |
| Anilide | 87-88 | 84-85 | 85-86 | 87-87.5 |

The following examples serve to illustrate the process of this invention and to demonstrate suitable conditions of operation. The quantities given are in parts by weight unless otherwise specified.

*Example I*

A silver lined reaction vessel is charged with 100 parts of a boron fluoride hydrate, having a mol ratio of $BF_3:H_2O$ of 1:1.7, and 0.4 part of benzoyl peroxide. The vessel is closed, placed in an agitation rack and connected with a source of ethylene. The vessel is pressured with ethylene to 300 atmospheres, closed and disconnected. The vessel is then connected to a source of carbon monoxide and carbon monoxide admitted to a total pressure of 500 atmospheres. Heating and agitation are started and during a reaction time of 10.75 hours throughout which the temperature is maintained at 114-115° C. and the pressure at 550-990 atmospheres the total observed pressure drop is 985 atmospheres. During the reaction the pressure is maintained in a desired range by the periodic addition of carbon monoxide. The vessel is cooled, bled of excess gas, opened and the reaction mixture discharged. This is steam distilled, the organic layer separated from the distillate and submitted to fractional distillation. After several small low boiling fractions the chief portion, amounting to 48 parts, is found to boil at 163-165° C. Analytical figures on this fraction are not entirely satisfactory and it is therefore submitted to precision distillation in a highly efficient still. Pure ethyl alpha-methyl-alpha-ethylbutyrate of boiling point 166-166.7° C. and refractive index 1.4100 is obtained. This sample analyzes 68.53% carbon and 10.61% hydrogen. The theoretical values of ethyl alpha-methyl-alpha-ethylbutyrate are 68.8% carbon and 10.38% hydrogen.

*Example II*

The preceding experiment is repeated except that ethylene is admitted to 400 atmospheres pressure followed by admission of carbon monoxide to a total pressure of 500 atmospheres. During a reaction time of 12 hours the total pressure drop is 1115 atmospheres. This reaction mixture yielded 44 parts of ethyl alpha-methyl-alpha-ethylbutyrate boiling at 165-167° C.

*Example III*

Example I is repeated except for the omission of the benzoyl peroxide. There is obtained from this 9 parts of ethyl alpha-methyl-alpha-ethylbutyrate boiling at 165-169° C.

The temperatures employed in the operation of this process may vary from about 50 to 200° C., although preferably from about 75 to 150° C. as previously pointed out.

The total pressure of ethylene and carbon monoxide in the operation of this process may be as low as about one atmosphere but is preferably higher, for example, from about 200 atmospheres to about 1000 atmospheres.

The ratio of ethylene to carbon monoxide (as measured by pressure) may range from about 1:3 to 10:1 or more. In general practice it is preferable however to keep the ratio between about 1:1 and 6:1.

The ethylene used in this invention should be of good quality. It may however contain small amounts of ethane, methane, hydrogen, nitrogen, carbon dioxide or oxygen. The tolerable amount of these impurities varies with the nature of the contaminant and is preferably kept low. Oxygen may have a corrosive action in this reaction system and its concentration is therefore kept as low as practical. The other gases such as nitrogen have no deleterious effect on the reaction and may in some instances be desirable. For example, if agitation is effected by bubbling the carbon monoxide and ethylene through the liquid phase, nitrogen may be used to advantage to increase the efficiency of this agitation.

The carbon monoxide used may be obtained from various commercial sources such as, for example, from water gas, producer gas, coke oven gas and the like. In order to obtain products of the highest purity it is preferable to remove from such commercial gases objectionable constituents.

Ethyl alpha-methyl-alpha-ethylbutyrate is suitably used as a solvent for a number of plastics and oils and is miscible with representative organic solvents. Suitable examples of plastics dissolved in this ester (either hot or cold) are ethyl cellulose; copolymers of vinyl acetate and vinyl chloride; chlorinated polyvinyl chloride; phenol-formaldehyde resins; polystyrene; polyisobutylene; polyethylene; acetals of polyvinyl alcohol and the like. The high chemical stability of the ester of this invention makes it particularly useful in many of these applications. Ethyl alpha-methyl-alpha-ethylbutyrate also has a very pleasant, camphoraceous odor which is quite persistent in small quantities. This property makes the ester useful as an ingredient for perfumes and cosmetics.

Various changes may be made in the details and preferred embodiments of this invention without departing therefrom or sacrificing any of the advantages thereof.

What is claimed is:

1. A process for the preparation of ethyl alpha-methyl-alpha-ethylbutyrate which comprises heating a mixture of carbon monoxide and ethylene in a strongly acid medium, the ethylene being present in molar excess, said strong acid being an acid-reacting hydrate of an inorganic compound.

2. A process for the preparation of ethyl alpha-methyl-alpha-ethylbutyrate which comprises heating a mixture of carbon monoxide and ethylene in the presence of a strong acid catalyst, the reactants being maintained in intimate mutual contact and the ethylene being present in molar excess, said strong acid being an acid-reacting hydrate of an inorganic compound.

3. A process for the preparation of ethyl alpha-methyl-alpha-ethylbutyrate which comprises heating a mixture of carbon monoxide and ethylene at a temperature in the range of 50 to 200° C., in the presence of a strong acid catalyst, the reactants being maintained in intimate mutual contact and the ethylene being present in molar excess, said strong acid being an acid-reacting hydrate of an inorganic compound.

4. A process for the preparation of ethyl alpha-methyl-alpha-ethylbutyrate which comprises heating a mixture of carbon monoxide and ethylene at a temperature in the range of 75 to 150° C., in the presence of a strong acid catalyst, the reactants being maintained in intimate mutual contact and the ethylene being present in a molar excess, said strong acid being an acid-reacting hydrate of an inorganic compound.

5. A process for the preparation of ethyl alpha-methyl-alpha-ethylbutyrate which comprises heating a mixture of carbon monoxide and ethylene at a temperature in the range of 50 to 200° C. and at a pressure of 200 to 1000 atmospheres, in the presence of a strong acid catalyst, the reactants being maintained in intimate mutual contact and the ethylene being present in molar excess, said strong acid being an acid-reacting hydrate of an inorganic compound.

6. A process for the preparation of ethyl alpha-methyl-alpha-ethylbutyrate which comprises heating a mixture of carbon monoxide and ethylene in the presence of a strong acid catalyst and a peroxide compound, at a temperature in the range of 50 to 200° C. and at a pressure of at least one atmosphere, the ratio of ethylene to carbon monoxide being in the range of from above 1 to 1 to as high as 10 to 1, said strong acid being an acid-reacting hydrate of an inorganic compound.

7. A process for the preparation of ethyl alpha-methyl-alpha-ethylbutyrate which comprises heating a mixture of carbon monoxide and ethylene in the presence of boron fluoride hydrate and the ethylene being present in molar excess.

8. A process for the preparation of ethyl alpha-methyl-alpha-ethylbutyrate which comprises heating a mixture of carbon monoxide and ethylene at a temperature in the range of 50 to 200° C. and at a pressure of at least one atmosphere, in the presence of boron fluoride hydrate, the reactants being maintained in intimate mutual contact and the ethylene being present in molar excess.

9. A process for the preparation of ethyl alpha-methyl-alpha-ethylbutyrate which comprises heating a mixture of carbon monoxide and ethylene in the presence of boron fluoride hydrate and a peroxide compound, at a temperature in the range of 50 to 200° C., and at a pressure of at least one atmosphere, the ratio of ethylene to carbon monoxide being in the range of from above 1 to 1 to as high as 10 to 1.

10. A process for the preparation of ethyl alpha-methyl-alpha-ethylbutyrate which comprises heating a mixture of carbon monoxide and ethylene at a temperature in the range of 75 to 150° C., in the presence of boron fluoride hydrate, the reactants being maintained in intimate mutual contact and the ethylene being present in molar excess.

11. A process for the preparation of ethyl alpha-methyl-alpha-ethylbutyrate which comprises heating a mixture of carbon monoxide and ethylene in the presence of boron fluoride hydrate and a peroxide, at a temperature in the range of 75 to 150° C., and at a pressure of at least one atmosphere, the ratio of ethylene to carbon monoxide being in the range of from above 1 to 1 to as high as 10 to 1.

12. A process for the preparation of ethyl alpha-methyl-alpha-ethylbutyrate which comprises heating a mixture of carbon monoxide and ethylene at a temperature in the range of 75 to 150° C. and at a pressure of 200 to 1000 atmospheres, in the presence of a peroxide compound and boron fluoride hydrate, the reactants being maintained in intimate mutual contact and the ethylene being present in molar excess.

13. A process for the preparation of ethyl alpha-methyl-alpha-ethylbutyrate which comprises heating a mixture of carbon monoxide and ethylene in the presence of boron fluoride hydrate and a peroxide compound, at a temperature in the range of 75 to 150° C. and at a pressure of 200 to 1000 atmospheres, the ratio of ethylene to carbon monoxide being in the range of from above 1 to 1 to as high as 10 to 1.

14. Ethyl alpha-methyl-alpha-ethylbutyrate.

WILLIAM E. HANFORD.
JOHN R. ROLAND.